(12) United States Patent
Lv et al.

(10) Patent No.: US 12,525,412 B2
(45) Date of Patent: Jan. 13, 2026

(54) LIFTING KEY AND ELECTRONIC DEVICE

(71) Applicant: VIVO MOBILE COMMUNICATION CO., LTD., Dongguan (CN)

(72) Inventors: Lei Lv, Dongguan (CN); Qingbin Cai, Dongguan (CN); Zhengwang Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 329 days.

(21) Appl. No.: 18/383,476

(22) Filed: Oct. 24, 2023

(65) Prior Publication Data

US 2024/0055198 A1 Feb. 15, 2024

Related U.S. Application Data

(63) Continuation of application No. PCT/CN2022/088696, filed on Apr. 24, 2022.

(30) Foreign Application Priority Data

Apr. 29, 2021 (CN) .......................... 202110476744.0

(51) Int. Cl.
*G06F 1/16* (2006.01)
*H01H 13/14* (2006.01)
(Continued)

(52) U.S. Cl.
CPC ............ *H01H 13/20* (2013.01); *H01H 13/14* (2013.01); *H01H 2221/056* (2013.01)

(58) Field of Classification Search
CPC ........ H01H 13/20; H01H 13/14; H01H 13/12; H01H 13/22; H01H 13/24; H01H 13/26; H01H 2221/056
See application file for complete search history.

(56) References Cited

U.S. PATENT DOCUMENTS

| | | | |
|---|---|---|---|
| 6,434,333 B2* | 8/2002 | Tanaka | G02B 7/102 396/132 |
| 2005/0098413 A1* | 5/2005 | Uehira | H01H 61/0107 200/5 R |

(Continued)

FOREIGN PATENT DOCUMENTS

| | | |
|---|---|---|
| CN | 110113513 A | 8/2019 |
| CN | 210927681 U | 7/2020 |

(Continued)

OTHER PUBLICATIONS

International Search Report issued in corresponding International Application No. PCT/CN2022/088696, mailed Jun. 28, 2022, 4 pages.

(Continued)

*Primary Examiner* — Anthony M Haughton
(74) *Attorney, Agent, or Firm* — IPX PLLC

(57) ABSTRACT

A lifting key and an electronic device are provided. The lifting key includes a key body, telescopically arranged on an installation body; and a transmission module, movably arranged on the installation body. The transmission module is arranged opposite to the key body. The lifting key further includes a drive module. The drive module includes a drive part and a power transmission mechanism connected with the drive part. The drive part includes at least a shape memory alloy part, and the power transmission mechanism is arranged opposite to the transmission module. The lifting key also includes a metal contact. The metal contact is arranged between the key body and the transmission module. When powered on, the shape memory alloy part deforms, and drives, sequentially through the power transmission mechanism, the transmission module and the metal contact, the key body to extend relative to the installation space. The electronic device includes the lifting key.

20 Claims, 17 Drawing Sheets

(51) Int. Cl.
  *H01H 13/20* (2006.01)
  *H05K 5/00* (2025.01)
  *H05K 7/00* (2006.01)

(56) References Cited

U.S. PATENT DOCUMENTS

| | | | |
|---|---|---|---|
| 2005/0155444 A1* | 7/2005 | Otaki | F16H 25/2454 |
| | | | 74/89 |
| 2008/0248247 A1 | 10/2008 | Caine | |
| 2011/0000207 A1* | 1/2011 | Kume | G02B 7/08 |
| | | | 60/528 |
| 2012/0120513 A1* | 5/2012 | Kotanagi | G03B 13/34 |
| | | | 359/823 |
| 2012/0319445 A1* | 12/2012 | Zolno | B60N 2/0296 |
| | | | 74/665 F |
| 2016/0032623 A1* | 2/2016 | DeWalch | E05B 49/002 |
| | | | 70/278.2 |
| 2017/0097663 A1 | 4/2017 | Gault et al. | |
| 2019/0326081 A1 | 10/2019 | Kurma Raju et al. | |
| 2020/0012168 A1* | 1/2020 | Kim | G03B 5/00 |
| 2021/0020392 A1* | 1/2021 | Chen | H01H 13/7073 |
| 2022/0136488 A1* | 5/2022 | Kazi | G02B 6/3859 |
| | | | 60/527 |
| 2022/0345021 A1* | 10/2022 | Duan | G03B 30/00 |
| 2024/0011796 A1* | 1/2024 | Martin | G02B 27/0172 |

FOREIGN PATENT DOCUMENTS

| | | |
|---|---|---|
| CN | 113161179 A | 7/2021 |
| EP | 1505615 A1 | 2/2005 |
| EP | 1548776 A1 | 6/2005 |
| IN | 111949074 A | 11/2020 |
| IN | 112164608 A | 1/2021 |
| TW | I684056 B | 2/2020 |

OTHER PUBLICATIONS

First Office Action issue in related Chinese Application No. 202110476744.0 , mailed Mar. 21, 2022, 12 pages.
Second Office Action issue in related Chinese Application No. 202110476744.0 , mailed Dec. 21, 2022, 7 pages.
Extended European Search Report issued in related European Application No. 22794798.3, mailed Oct. 16, 2024, 9 pages.

* cited by examiner

LIFTING KEY AND ELECTRONIC DEVICE

CROSS-REFERENCE TO RELATED APPLICATIONS

The present application is a continuation of International Application No. PCT/CN2022/088696, filed on Apr. 24, 2022, which claims priority to Chinese Patent Application No. 202110476744.0, filed on Apr. 29, 2021. The entire contents of each of the above-referenced applications are expressly incorporated herein by reference.

TECHNICAL FIELD

The present application belongs to the technical field of electronic products, and in particular relates to a lifting key and an electronic device.

BACKGROUND

With the development of electronic devices, users have higher and higher requirements for electronic devices, such as operation requirements and appearance requirements. In order to further improve the appearance and performance of the electronic devices, some functional modules of the electronic devices extend out of the electronic devices when needed, and retract into the electronic devices when not used. In order to realize the switching process of the functional modules, some electronic devices use stepper motors to drive the functional modules to extend and retract. However, the overall size of the module body of the stepping motor is relatively large, which makes the electronic device thicker, deteriorates the hand feeling, and affects the user experience.

SUMMARY

The purpose of the embodiments of the present application is to provide a lifting key and an electronic device.

The present application is implemented as follows.

An embodiment of the present application provides a lifting key, where the lifting key includes.

- a key body, where the key body is telescopically arranged on an installation body:
- a transmission module, where the transmission module is movably arranged on the installation body, and the transmission module is arranged opposite to the key body;
- a drive module, where the drive module includes a drive part and a power transmission mechanism connected with the drive part, the drive part at least includes a shape memory alloy part, and the power transmission mechanism is arranged opposite to the transmission module; and
- a metal contact, where the metal contact is arranged between the key body and the transmission module;
- where in the case of power on, the shape memory alloy part deforms, and drives the key body to extend relative to the installation body sequentially through the power transmission mechanism, the transmission module, and the metal contact.

An embodiment of the present application provides an electronic device, and the electronic device includes an electronic device body and a lifting key; and the electronic device body has an installation space, and the lifting key is arranged in the installation space.

In the embodiments of the present application, the drive part at least includes a shape memory alloy part, when the shape memory alloy part is powered on, its shape changes, such as retracts, at the same time, the shape memory alloy part transmits power and motion to the transmission module through the power transmission mechanism, so that the transmission module moves, and when the transmission module moves, the metal contact drives the key body to move relative to the installation body, so that the key body can extend out of the installation body, so as to facilitate the user's operation or use of the key body. Compared with some motor-driven lifting methods, the lifting key in the present application does not have a mechanical structure such as a motor, but uses a shape memory alloy part to provide the driving force, which reduces the volume of the lifting key to a certain extent, so that when the lifting key is installed in the electronic device body, the electronic device does not become bulky, thereby improving the user experience.

DETAILED DESCRIPTION

Figure 1:
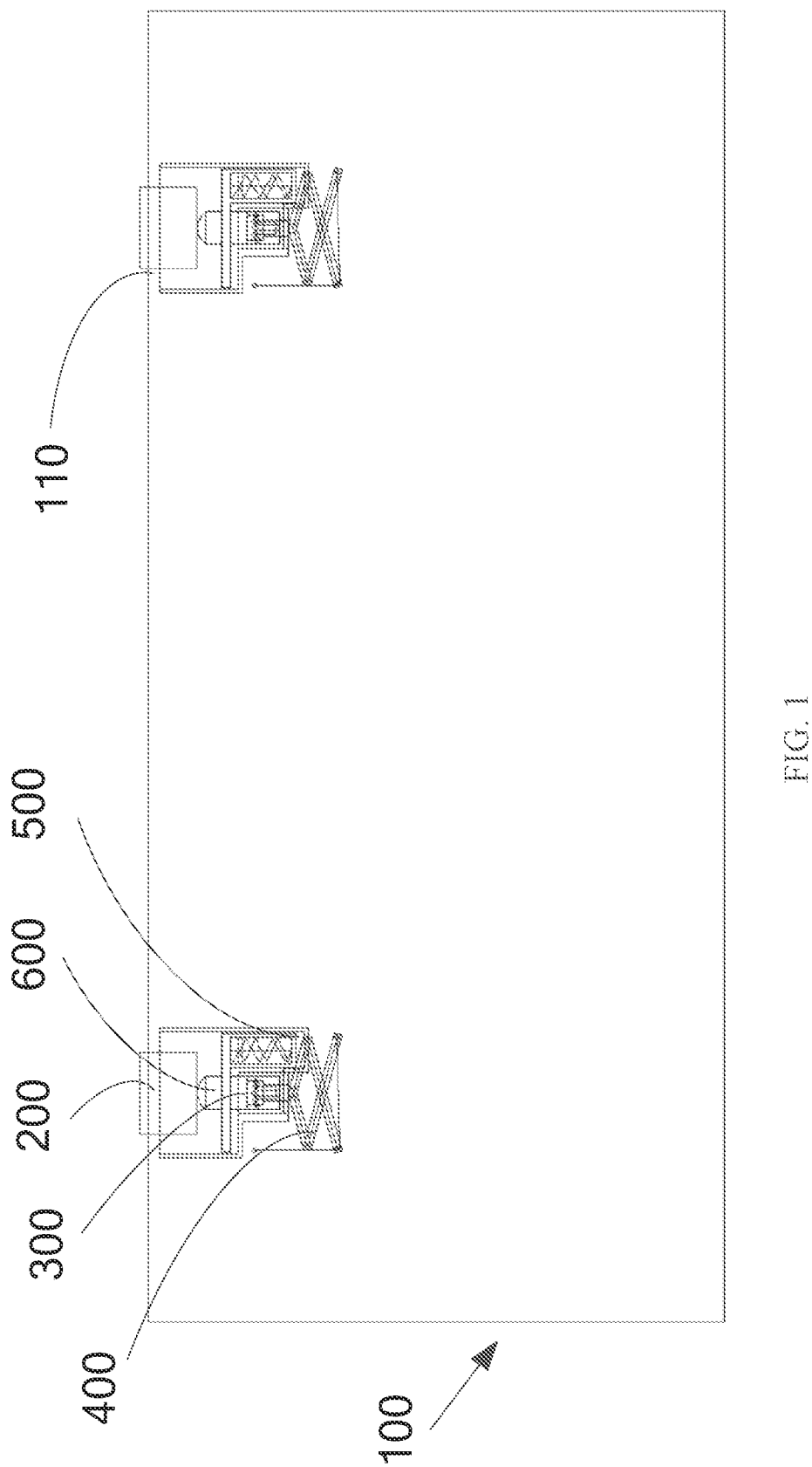
FIG. 1 is a schematic diagram in which a lifting key in a first form extends relative to an electronic device body according to an embodiment of the present application.
Figure 2:
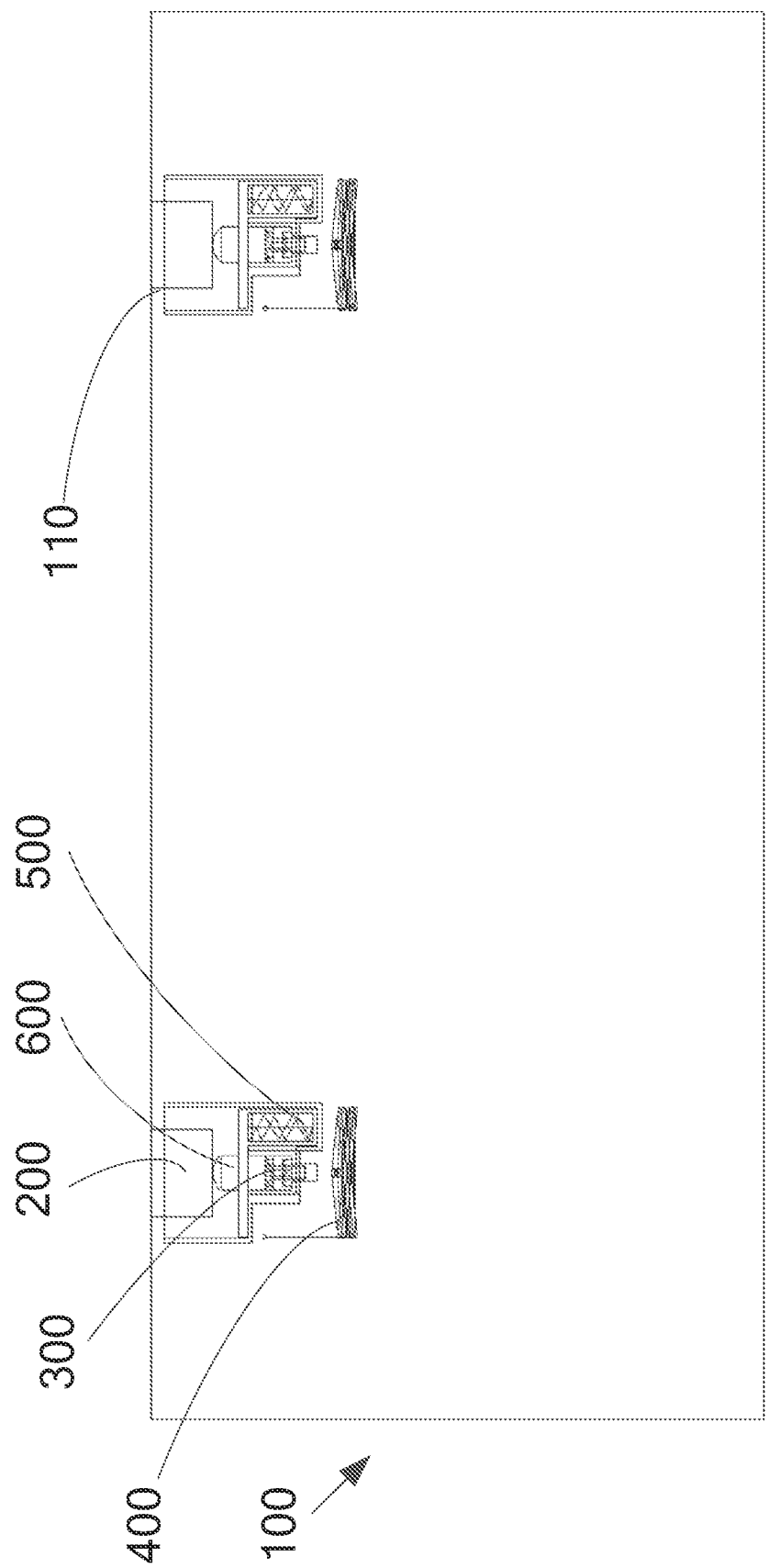
FIG. 2 is a schematic diagram in which a lifting key in a first form retracts relative to an electronic device body according to an embodiment of the present application.
Figure 3:
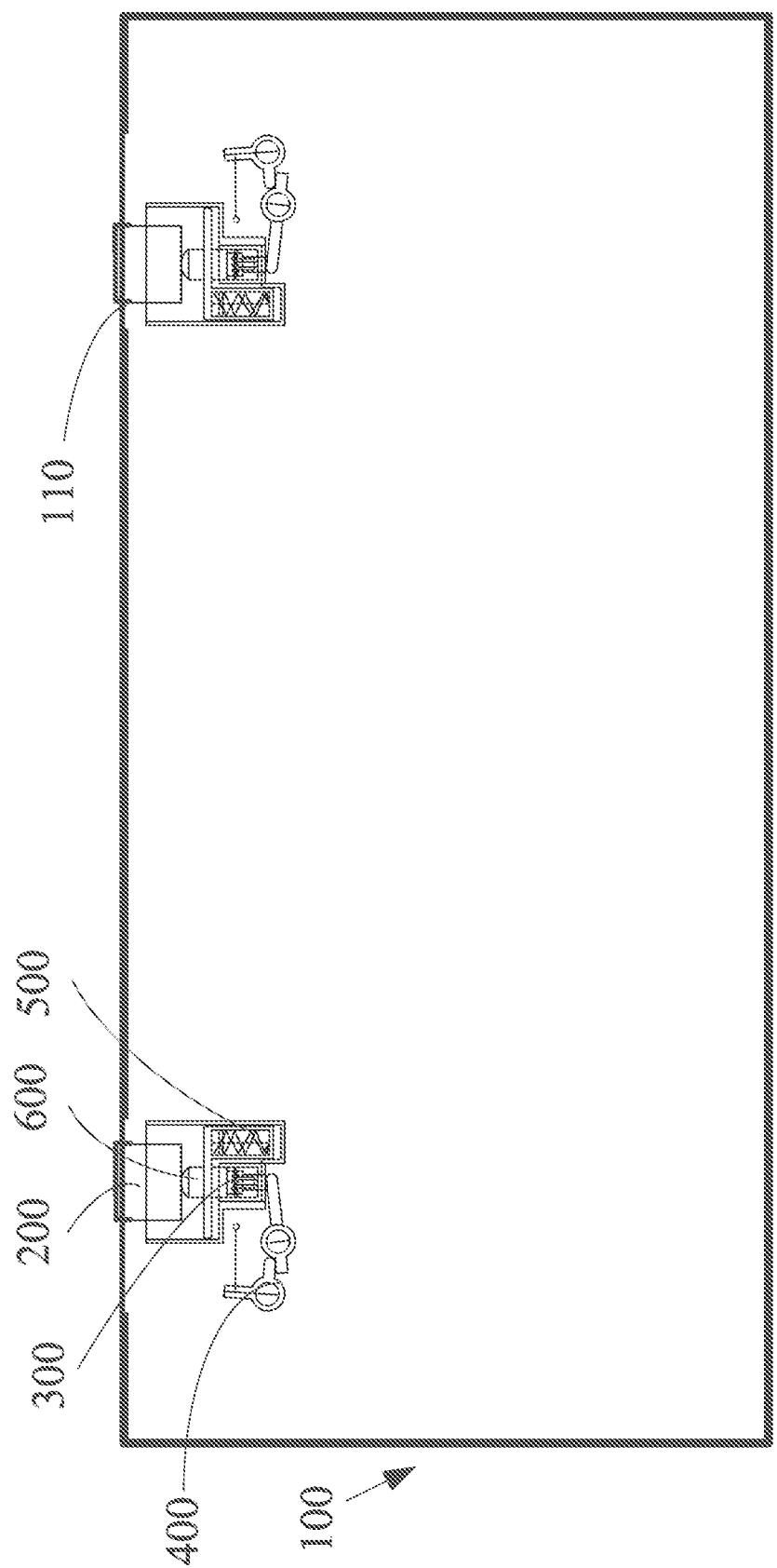
FIG. 3 is a schematic diagram in which a lifting key in a second form extends relative to an electronic device body according to an embodiment of the present application.
Figure 4:
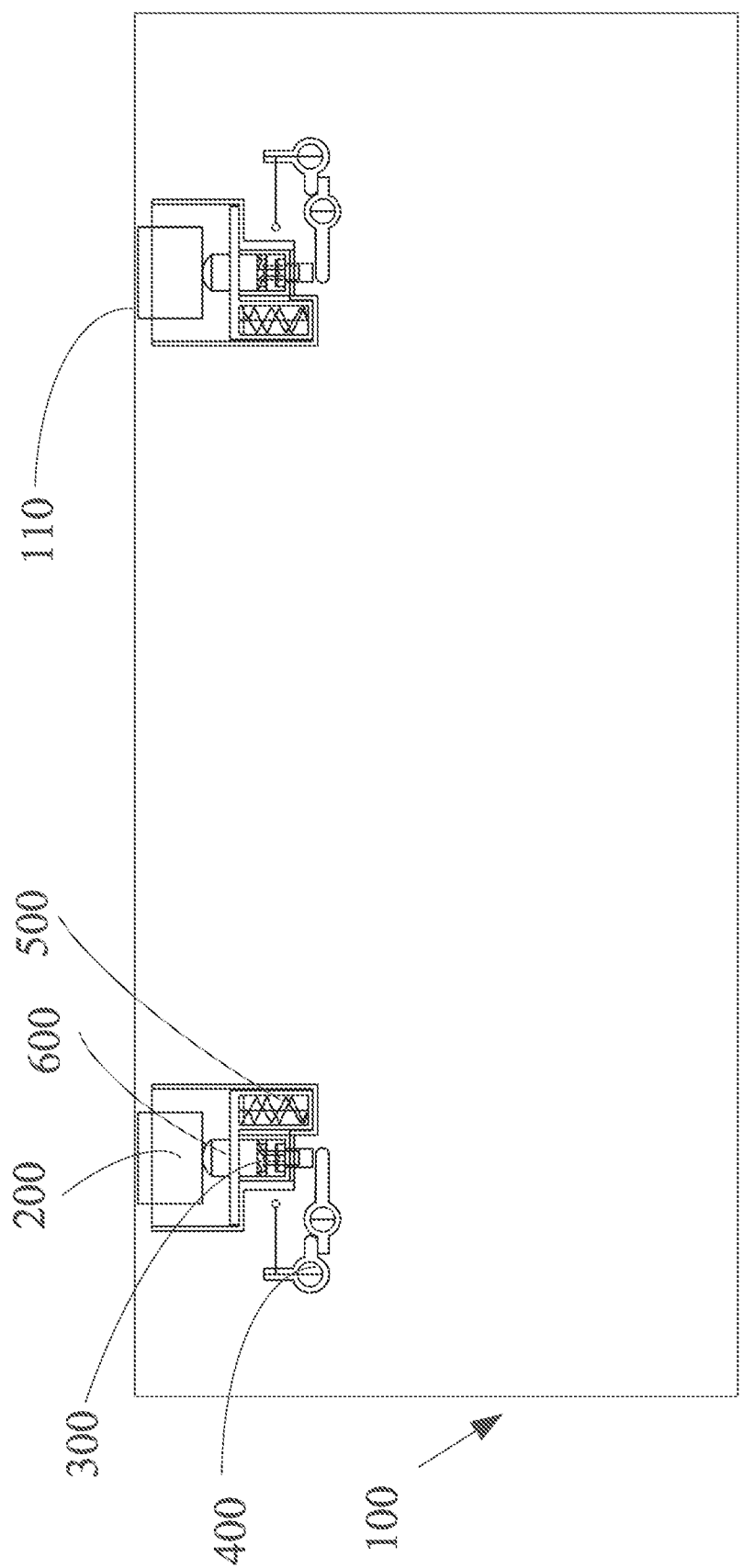
FIG. 4 is a schematic diagram in which a lifting key in a second form retracts relative to an electronic device body according to an embodiment of the present application.

The following clearly describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

The terms "first", "second", and the like in the description and the claims of the present application are used to distinguish between similar objects, and do not need to be used to describe a specific order or sequence. It should be understood that, data used in such a way is interchangeable in proper circumstances, so that the embodiments of the present application can be implemented in an order other than the order illustrated or described herein. Objects classified by "first", "second", and the like are usually of a same type, and the quantity of objects is not limited. For example, there may be one or more first objects. In addition, in the specification and the claims, "and/or" represents at least one of connected objects, and a character "/" generally represents an "or" relationship between associated objects.

The embodiments of the present application will be described in detail below through specific embodiments and application scenarios with reference to the accompanying drawings.

Referring to FIG. 1 to FIG. 4, the embodiments of the present application disclose a lifting key, and the disclosed lifting key includes a key body 200, a transmission module 300, a drive module 400, and a metal contact 600.

The key body 200 is telescopically arranged on the installation body. In some embodiments, a guide structure, such as a slide rail, a chute, or a guide rod may be provided between the key body 200 and the installation body, and can limit the direction of movement of the key body 200, thereby improving the movement accuracy of the key body 200. In the embodiments of the present application, the key body 200 may be components such as game shoulder keys, cameras, sound chambers, and antennas. In addition, it may also be other telescopic functional parts, and the specific types are not limited in the embodiments of the present application.

In some embodiments, the lifting key can be applied to electronic devices, where the electronic devices can be mobile phones, tablet computers, e-books, wearable devices and the like. The electronic device includes an electronic device body 100 having an installation space 110. In some embodiments, the electronic device body 100 may include a frame body, which may be the installation body, the frame body has an installation hole, the installation hole may be the installation space, and the lifting key is arranged in the installation hole. The frame body includes multiple installation holes, so that multiple groups of lifting keys can be installed at the same time to meet different needs. For example, when the lifting key is used as a game shoulder key, two groups can be arranged, corresponding to the user's left hand and right hand respectively, so that the user can operate the game shoulder key with the left hand and right hand respectively, thereby facilitating operation and improving the gaming experience. In addition, the lifting key can also be used as other functional parts of the electronic device, for example, a camera that can be lifted or lowered, a sound chamber that can be lifted or lowered, an antenna that can be lifted or lowered, and the like.

The transmission module 300 is a component for transmitting power and motion, which can transmit the power and motion to the key body 200. The transmission module 300 is movably arranged on the installation body, and the transmission module 300 is disposed opposite to the key body 200. In some embodiments, a guide structure may be provided between the transmission module 300 and the installation body, for example, slide rails, slide grooves, or guide rods, and can limit the moving direction of the transmission module 300, thereby improving the movement accuracy of the transmission module 300 to ensure that the transmission module 300 can touch the key body 200.

The drive module 400 is a power component, which can at least provide power for the key body 200 to extend relative to the installation body. The drive module 400 includes a drive part 410 and a power transmission mechanism 420, the drive part 410 is connected with the power transmission mechanism 420, and the power transmission mechanism 420 is arranged opposite to the transmission module 300. In this way, the drive part 410 can transmit power and motion to the transmission module 300 through the power transmission mechanism 420, and then the transmission module 300 transmits the power and motion to the key body 200 through the metal contact 600, so as to drive the key body 200 to extend relative to the installation body.

The metal contact 600 is a pressure detection component of the lifting key. The metal contact 600 is arranged between the key body 200 and the transmission module 300. The pressure from the key body 200 can be converted into an electrical signal through the metal contact 600 and the electrical signal can be transmitted to a circuit board of the electronic device, so as to feed back the pressing operation behavior on the key body 200, and then realize the operation of the electronic device by pressing the key body 200.

In order to reduce the overall volume and mechanism complexity of the drive module 400, the drive part 410 in the embodiments of the present application at least includes a shape memory alloy part, and the shape memory alloy part has the characteristic of changing the shape according to a power-on state, that is, in the case of power on, the shape memory alloy part can deform, and the shape memory alloy can return to the original shape when the power is cut off.

Based on the above settings, in the embodiments of the present application, the shape memory alloy part is used as the drive part 410. Since the power transmission mechanism 420 is connected with the drive part 410, when the shape memory alloy part is in the power-on state, its shape changes, such as retracts or bends, so that the power transmission mechanism 420 can be driven to move relative to the installation body. At the same time, the transmission module 300 moves relative to the installation body with the movement of the power transmission mechanism 420, and the transmission module 300 drives, through the metal contact 600, the key body 200 to extend at least relative to the installation body, so that the user can operate or use the key body 200.

It should be noted herein that there are many manners to drive the key body 200 to retract relative to the installation body. In a first manner, the key body 200 is directly connected with the return part, such as a spring. When the shape memory alloy part is powered off, it is in the initial shape. At this time, the drive module 400 does not exert force on the transmission module 300, so that it does not exert force on the key body 200. Under the return action of the return part, the key body 200 can retract to the installation body. In a second manner, the key body 200, the metal contact 600 and the transmission module 300 are connected sequentially. At this time, the transmission module 300 can be directly connected with the return part. When the shape memory alloy part is powered off, it is in the initial shape, and the drive module 400 does not exert force on the transmission module 300, so that under the return action of the return part, the transmission module 300, the metal contact 600 and the key body 200 return synchronously, so that the key body 200 retracts to the installation body. In a third manner, the key body 200, the metal contact 600 and the transmission module 300 are connected in sequentially, and the transmission module 300 is fixedly connected with the drive module 400. In this way, when the shape memory alloy part is switched from the power-on state to the power-off state, its shape gradually returns to the original state. During this process, the shape memory alloy part can drive the key body 200 to retract to the installation body through the power transmission mechanism 420, the transmission module 300 and the metal contact 600 in sequence. In a fourth manner, when the shape memory alloy part is powered off, it is in the initial shape, the drive module 400 does not exert force on the transmission module 300, and the transmission module 300 does not exert force on the key body 200. At this time, the user can press the key body 200, so that the key body 200 can be pressed into the installation body. In the embodiments of the present application, the retraction manner of the key body 200 is not limited, as long as the requirements can be met.

In the embodiments of the present application, a shape memory alloy part is used as the drive part 410, when the shape memory alloy part is powered on, its shape changes, such as retracts, at the same time, the shape memory alloy part transmits power and motion to the transmission module 300 through the power transmission mechanism 420, so that the transmission module 300 moves, and when the transmission module 300 moves, the metal contact 600 drives the key body 200 to move relative to the installation body, so that the key body 200 can extend out of the installation body, so as to facilitate the user's operation or use of the key body 200. Compared with some motor-driven lifting methods, the lifting key in the present application does not have a mechanical structure such as a motor, but uses a shape memory alloy part to provide the driving force, which reduces the volume of the lifting key to a certain extent, so that when the lifting key is installed in the installation body, the electronic device does not become bulky, thereby improving the user experience.

Referring to FIG. 1, FIG. 2, FIG. 7 and FIG. 8, in some embodiments, the power transmission mechanism 420 includes a telescopic rod group 421 and a thrust rod group 422 that are connected, and the telescopic rod group 421 can be extended or shortened to drive the thrust rod group 422 to move. The drive part 410 is in transmission connection with the telescopic rod group 421, and under the driving action of the drive part 410, the telescopic rod group 421 can be extended or shortened. The thrust rod group 422 is arranged opposite to the transmission module 300, so that the power and motion on the drive part 410 can be transmitted to the transmission module 300 through the telescopic rod group 421 and the thrust rod group 422, and the transmission module 300 can transmit the power and motion to the key body 200 through the metal contact 600.

Further, the telescopic rod group 421 includes a first support rod 4211 and a second support rod 4212 that are arranged in a cross manner, where a first end of the first support rod 4211 is hinged to the installation body, so that the first support rod 4211 can rotate relative to the installation body. A second end of the first support rod 4211 is hinged to the thrust rod group 422, so that a part of the thrust rod group 422 can rotate relative to the first support rod 4211. A first end of the second support rod 4212 can move and rotate relative to the installation body, that is, the first end of the second support rod 4212 can not only rotate relative to the installation body, but also move in a certain direction relative to the electronic device. A second end of the second support rod 4212 is hinged to the thrust rod group 422, so that other parts of the thrust rod group 422 rotate relative to the second support rod 4212.

In some embodiments, the thrust rod group 422 includes a first thrust rod and a second thrust rod, where the first thrust rod and the second thrust rod are arranged in a herringbone shape, that is, one end of the first thrust rod is connected with the end of the second thrust rod, so that the two can rotate relative to each other. The other end of the first thrust rod is hinged to the second end of the second support rod 4212, and the other end of the second thrust rod is hinged to the second end of the first support rod 4211. In this way, when the first support rod 4211 is opposite to the second support rod 4212, the first thrust rod and the second thrust rod can move accordingly, and the angle between the first thrust rod and the second thrust rod changes. At the same time, the telescopic rod group 421 can telescopically stretch in a direction parallel to the lifting direction of the key body 200, the thrust rod group 422 can also telescopically stretch in a direction parallel to the lifting direction of the key body 200, and the telescopic rod group 421 and the thrust rod group 422 have the same extension direction, so that the power transmission mechanism 420 can stretch in a direction parallel to the lifting direction of the key body 200, and then the key body 200 can be driven to extend out of the installation body through the transmission module 300 and the metal contact 600.

One end of the drive part 410 is connected with the first end of the second support rod 4212, the middle part of the drive part 410 is supported at a hinge joint between the first support rod 4211 and the installation body, and the other end of the drive part 410 is electrically connected with the circuit board of the electronic device and is fixed. In some embodiments, the drive part 410 can be a shape memory alloy wire, one end of the shape memory alloy wire is fixedly connected with the first end of the second support rod 4212, the other end of the shape memory alloy wire can be fixed on the installation body, and the middle part of the shape memory alloy wire is wound at a hinge joint between the first support rod 4211 and the installation body. Based on this, when the user needs to extend the key body 200, the circuit board can obtain the user's demand information, and the circuit board controls the shape memory alloy part to power on. At this time, the shape memory alloy part retracts. Because one end of the shape memory alloy part is connected with the first end of the second support rod 4212, and the other end of the shape memory alloy part is fixed, the first end of the second support rod 4212 can be pulled to move towards the first end of the first support rod 4211, and at the same time, the first support rod 4211 and the second support rod 4212 rotate relative to the installation body respectively, so that the telescopic rod group 421 is extended, and the thrust rod group 422 is driven to extend and move accordingly, and then the thrust rod group 422 pushes the transmission module 300, and the transmission module 300 pushes the key body 200 to extend out of the installation body through the metal contact 600.

In some embodiments, the telescopic rod group 421 may include multiple pairs of first support rods 4211 and second support rods 4212 that are that are arranged in a cross manner, where the first support rods 4211 in one pair are hinged to the second support rods 4212 in the adjacent pair, and the second support rods 4212 in one pair are hinged to the first support rods 4211 in the adjacent pair. In the embodiments of the present application, the specific form of the telescopic rod group 421 is not limited, as long as the telescopic movement can be satisfied.

Referring to FIG. 3, FIG. 4, FIG. 9 and FIG. 10, in some other embodiments, the power transmission mechanism 420 includes a first toggle part 423 and a second toggle part 424 respectively rotatably disposed on the installation body, where the first toggle part 423 has a first toggling end 4231 for driving the second toggle part 424 to rotate, and the second toggle part 424 has a second toggling end 4241 for driving the transmission module 300 to move. One end of the drive part 410 is connected with the first toggle part 423, and the other end of the drive part 410 is electrically connected with the circuit board of the electronic device and is fixed. Based on the above settings, when the user needs to extend the key body 200, the circuit board can obtain the user's demand information, and the circuit board control the shape memory alloy part to power on. At this time, the shape memory alloy part retracts and drives the first toggle part 423 to rotate, as the first toggle part 423 rotates, the first toggle end 4231 on the first toggle part 423 touches the second toggle part 424, so that the second toggle part 424 rotates, and as the second toggle part 424 rotates, the second toggle end 4241 on the second toggle part 424 touches the transmission module 300, thereby pushing the transmission module 300 to move, and the transmission module 300 pushes the key body 200 to extend out of the installation body through the metal contact 600.

Further, the first toggle part 423 also has a third toggle end 4232, and the second toggle part 424 also has a fourth toggle end 4242. The third toggle end 4232 is connected with the drive part 410, and the fourth toggle end 4242 is configured to touch the first toggle end 4231 in some embodiments, the first toggle end 4231, the second toggle end 4241, the third toggle end 4232, and the fourth toggle end 4242 can all be convex structures or rod-shaped structures, so that the first toggle part 423 and the second toggle part 424 generate a rotational torque.

Referring to FIG. 5, FIG. 6, and FIG. 11 to FIG. 13, in some embodiments, the transmission module 300 includes a jacking part 310, a locking part 320 and a guide part 330, where the guide part 330 is arranged on the installation body, the guide part 330 has an accommodating space 331, and the accommodating space 331 is provided with a locking groove 332 and an avoidance groove 333 that are adjacent. The locking part 320 is movably and rotatably arranged in the accommodating space 331. The locking part 320 is provided with the locking block 321 and the locking part 320 is arranged opposite to the key body 200, the jacking part 310 is movably arranged on the guide part 330, and the jacking part 310 is arranged opposite to the power transmission mechanism 420. In some embodiments, the outer wall of the locking part 320 is provided with a plurality of locking blocks 321, correspondingly, a plurality of pairs of adjacent locking grooves 332 and the avoidance groove 333 are disposed in the accommodating space 331, and the locking blocks 321 can switch between the locking groove 332 and the avoidance groove 333.

Referring to FIG. 14 to FIG. 17, when the jacking part 310 jacks the locking part 320, the locking part 320 moves towards the key body 200 relative to the guide part 330, and at the same time, the locking part 320 can also rotate in the accommodating space 331, so that the locking block 321 can switch between the locking groove 332 and the avoidance groove 333. Besides, as the locking part 320 moves towards the key body 200, the metal contact 600 exerts a pressing force on the key body 200, so that the key body 200 extends out of the installation body. When the jacking part 310 releases the pressing effect on the locking part 320, and the key body 200 is subjected to the return action or the user's pressing action, the locking block 321 moves into the locking groove 332, and is subject to the supporting effect of the locking groove 332 and cannot move away from the key body 200, thereby effectively preventing the key body 200 from retracting accidentally into the installation body and affecting operation or usage. When the key body 200 is subjected to the return action or the user's pressing action, the locking block 321 moves into the avoidance groove 333, and the movement of the locking block 321 can be avoided through the avoidance groove 333, so that the locking block 321 is not supported by the avoidance groove 333, so that the locking part 320 can move away from the key body 200, and then the key body 200 can retract into the installation body.

Figure 11:
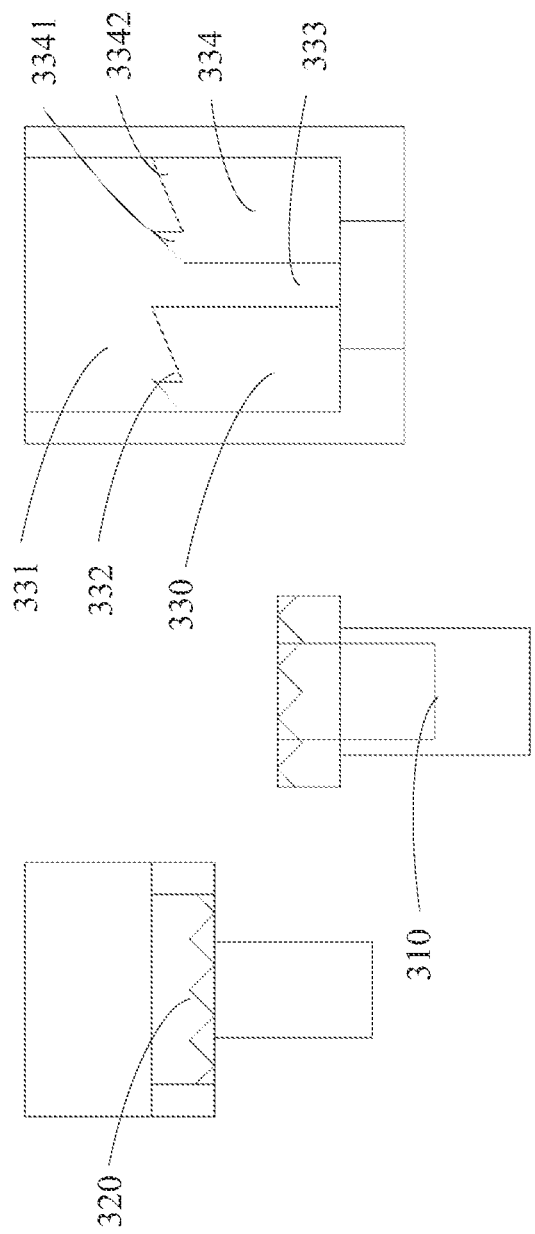
FIG. 11 is a schematic disassembly diagram of a transmission module according to an embodiment of the present application.
Figure 12:
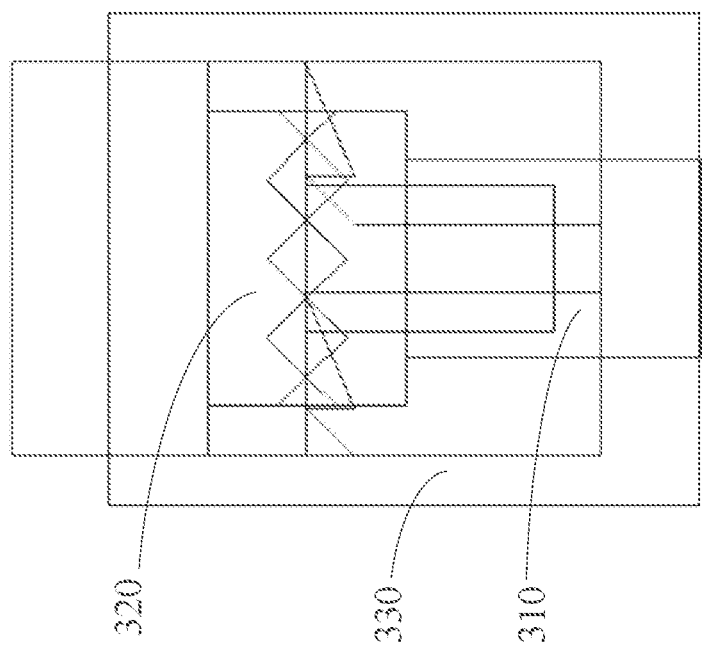
FIG. 12 is a first state diagram of a transmission module according to an embodiment of the present application.
Figure 13:
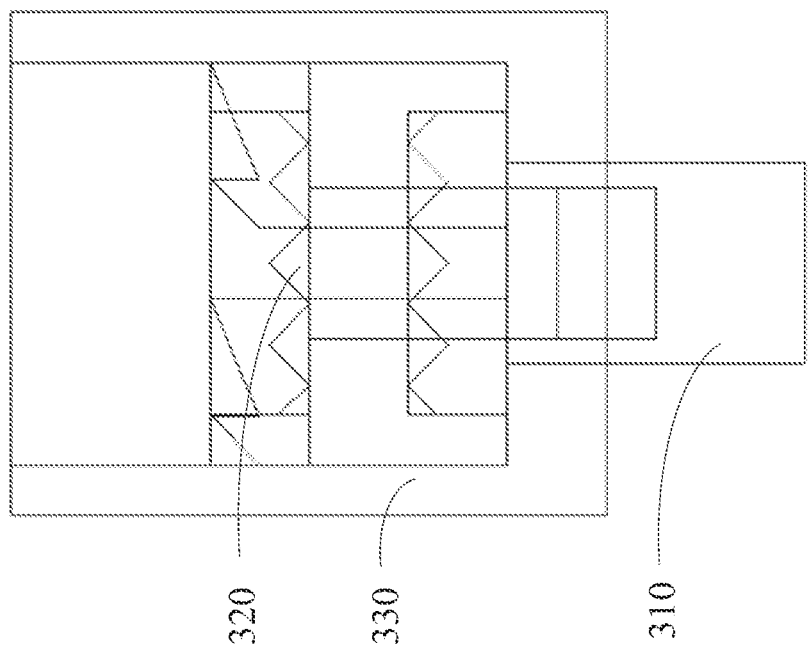
FIG. 13 is a second state diagram of a transmission module according to an embodiment of the present application.
Figure 14:
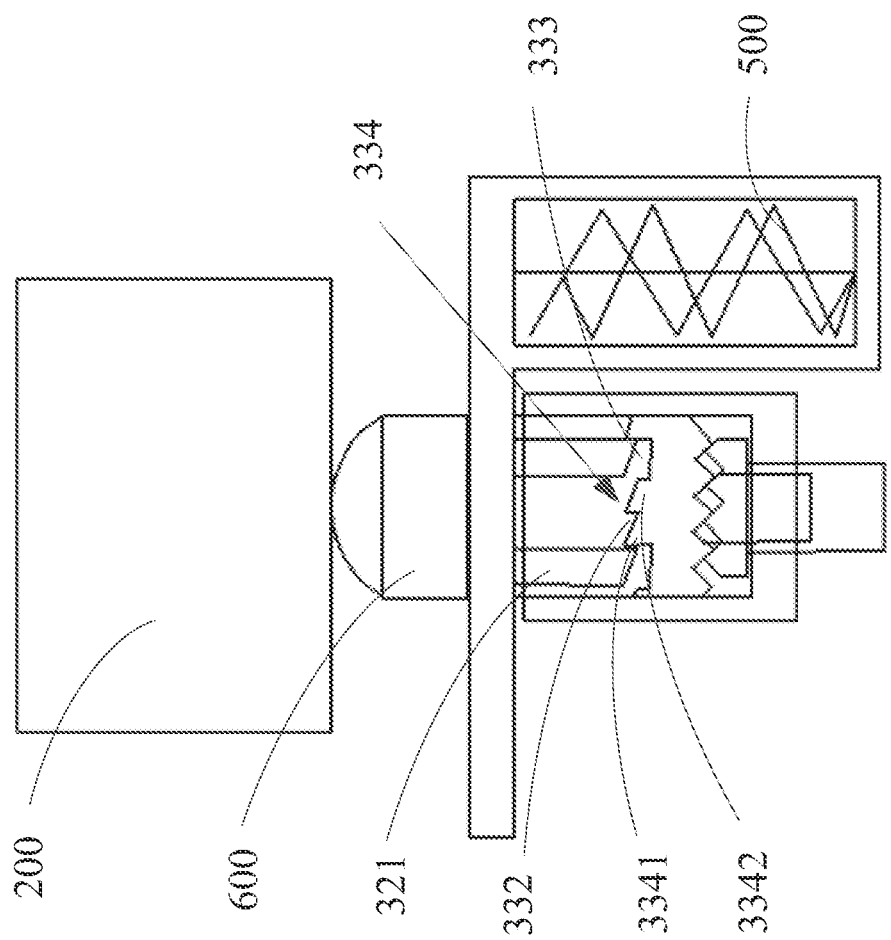
FIG. 14 is a state diagram in which a locking block starts to disengage from an avoidance groove according to an embodiment of the present application.
Figure 15:
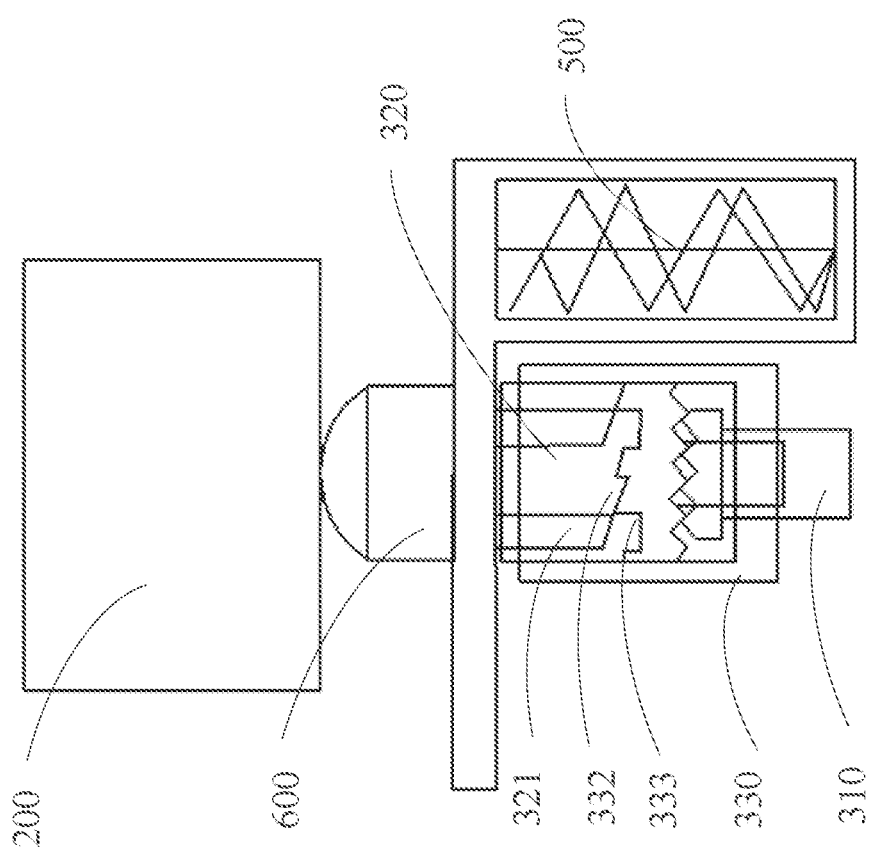
FIG. 15 is a state diagram in which a locking block disengages from an avoidance groove according to an embodiment of the present application.
Figure 16:
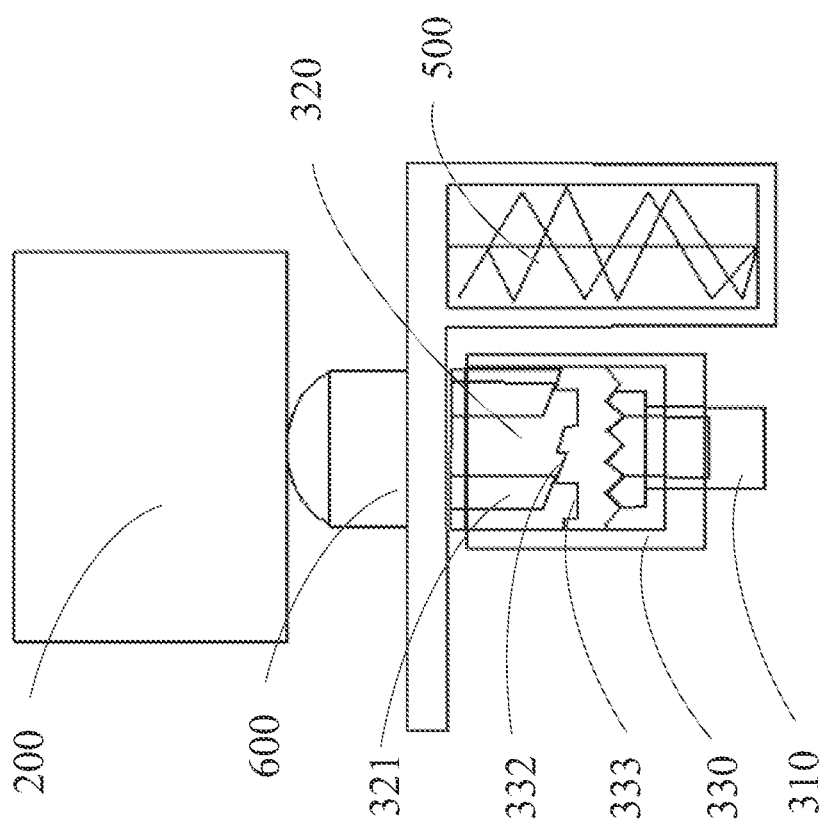
FIG. 16 is a state diagram in which a locking block starts to enter a locking groove according to an embodiment of the present application.
Figure 17:
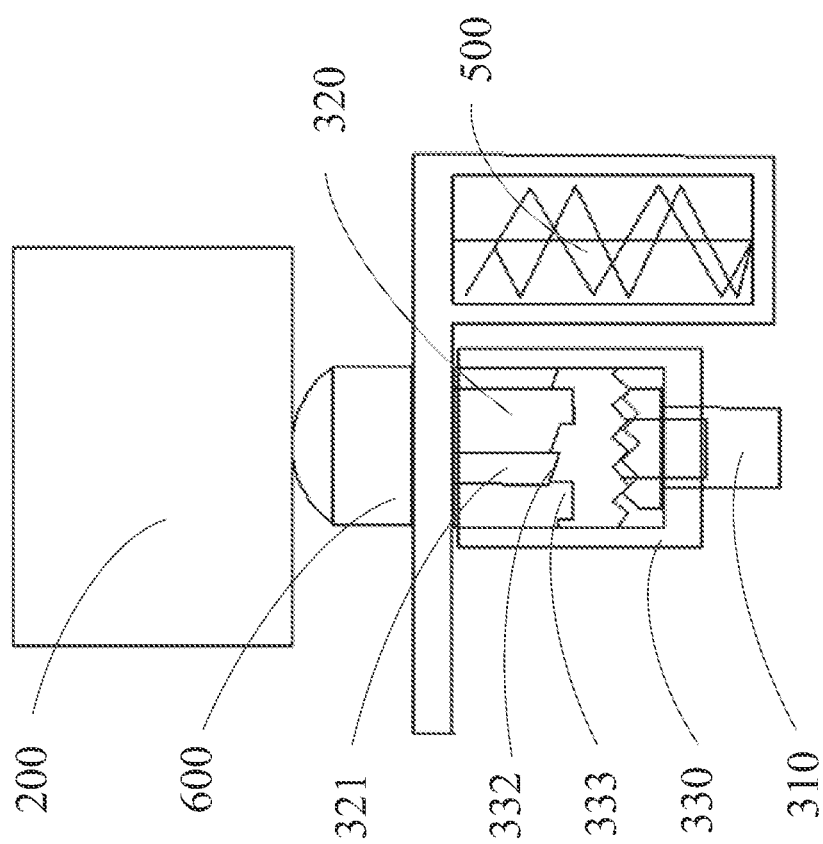
FIG. 17 is a state diagram in which a locking block enters a locking groove according to an embodiment of the present application.

Continuing to refer to FIG. 11, further, a protrusion 334 is provided in the accommodating space 331, an end surface of the protrusion 334 is provided with a first tooth-shaped structure 3341 and a second tooth-shaped structure 3342, the locking groove 332 is formed between the first tooth-shaped structure 3341 and the second tooth-shaped structure 3342, and the avoidance groove 333 is respectively disposed on both sides of the protrusion 334.

In some embodiments, the end surface of the protrusion 334 may be in a sawtooth shape with two sawteeth. In order to enable the locking block 321 to smoothly enter the locking groove 332 and the avoidance groove 333, in the embodiments of the present application, the end face of the first tooth-shaped structure 3341 the end face of the second tooth-shaped structure 3342 are designed as inclined surfaces, and both directions of inclination of the two are the same. Similarly, the end surface of the locking block 321 opposite to the protrusion 334 is designed as an inclined surface. In this way, when the locking part 320 moves away from the key body 200, the inclined surface of the locking block 321 contacts the inclined surface of the first tooth-shaped structure 3341, and the inclined surface of the locking block 321 can slide towards the locking groove 332 along the inclined surface of the first tooth-shaped structure 3341, and at the same time, drives the locking part 320 to rotate, so that the locking block 321 moves into the locking groove 332. Similarly, the inclined surface of the locking block 321 contacts the inclined surface of the second tooth-shaped structure 3342, and the inclined surface of the locking block 321 can slide towards the avoidance groove 333 along the inclined surface of the second tooth-shaped structure 3342, and at the same time, drives the locking part 320 to rotate, so that the locking block 321 moves into the avoidance groove 333.

Figure 5:
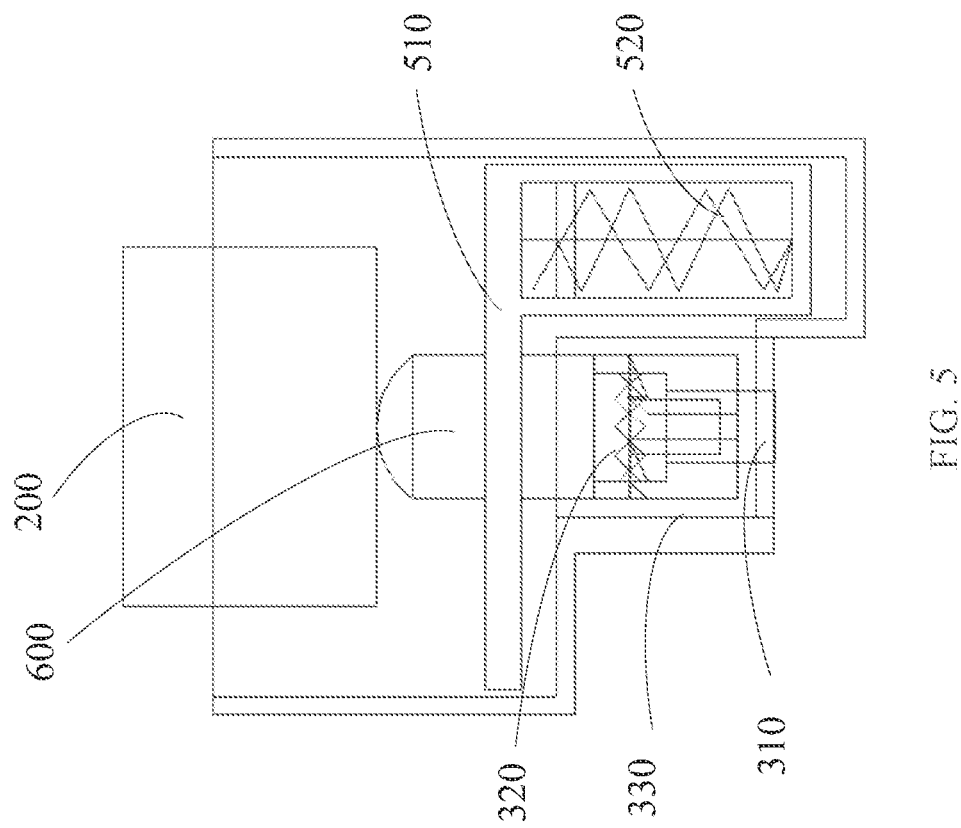
FIG. 5 is a first state diagram of a key body, a transmission module, a pressure detection module, and a return module according to an embodiment of the present application.
Figure 6:
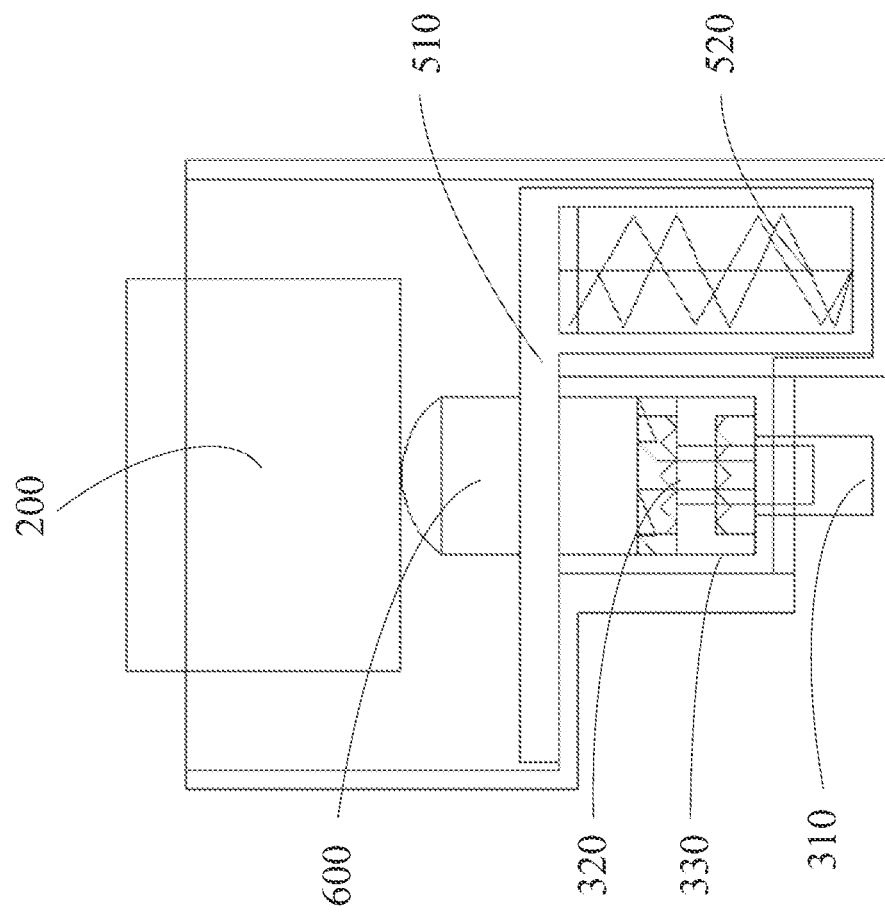
FIG. 6 is a second state diagram of a key body, a transmission module, a pressure detection module, and a return module disclosed in an embodiment of the present application.
Figure 7:
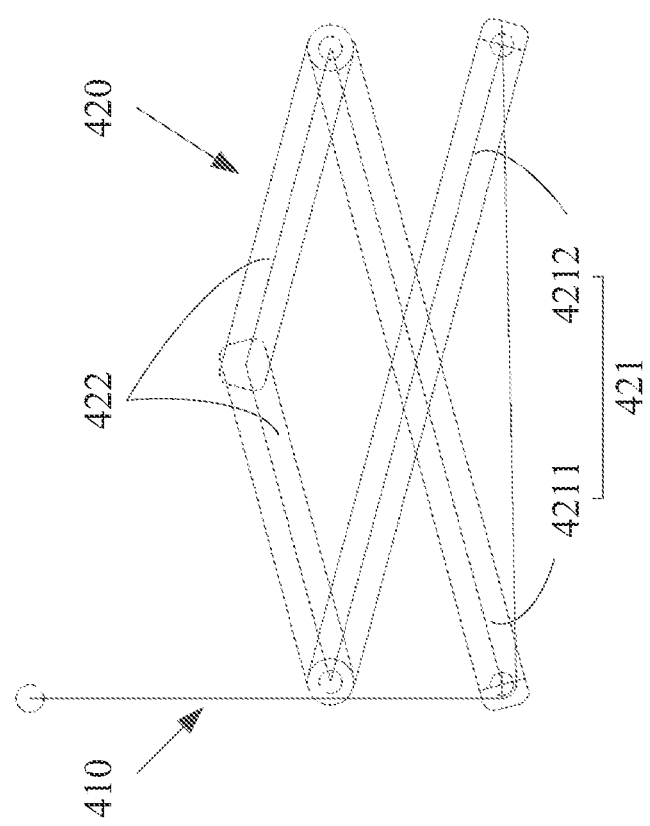
FIG. 7 is a first state diagram of a power transmission mechanism in a first form according to an embodiment of the present application.
Figure 8:
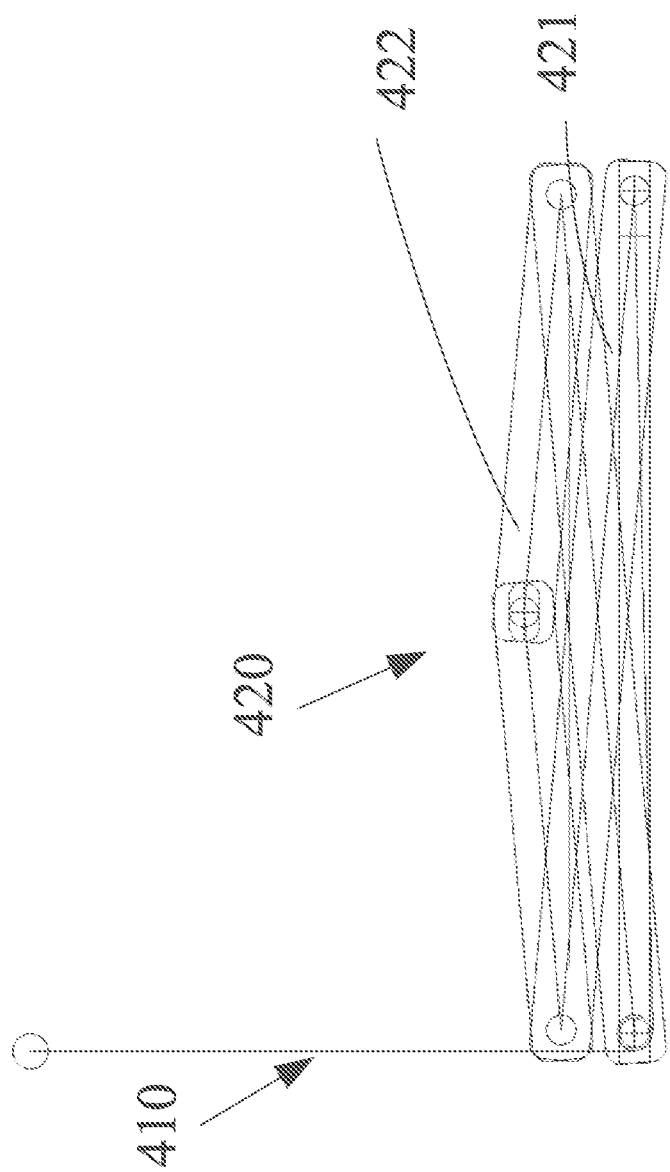
FIG. 8 is a second state diagram of a power transmission mechanism in a first form according to an embodiment of the present application.
Figure 9:
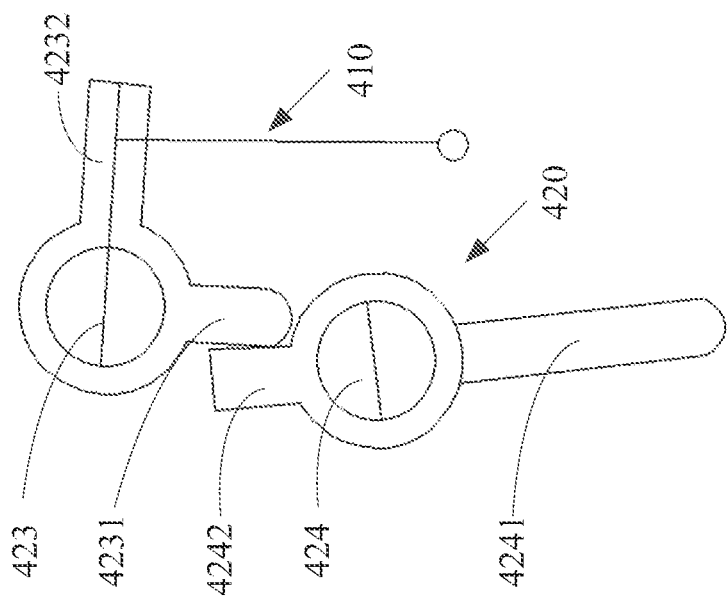
FIG. 9 is a first state diagram of a power transmission mechanism in a second form according to an embodiment of the present application.
Figure 10:
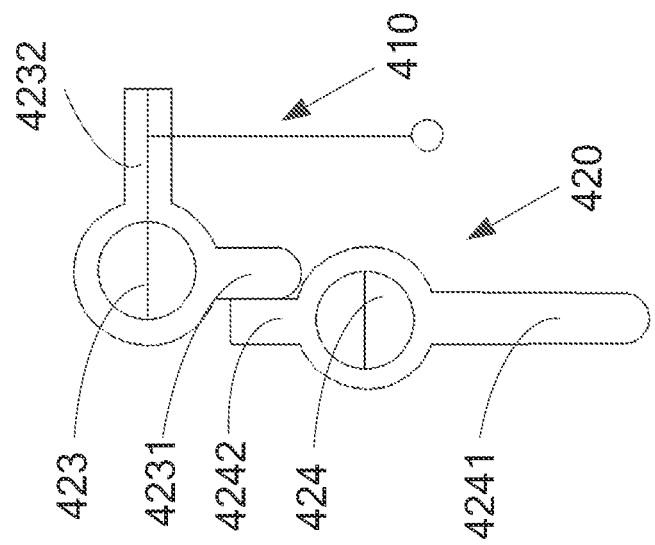
FIG. 10 is a second state diagram of a power transmission mechanism in a second form according to an embodiment of the present application.

Referring to FIG. 5 and FIG. 6, in order to enable the key body 200 to automatically retract into the installation space 110, a return module 500 is added in the embodiments of the present application, the return module 500 is connected with the key body 200, and the return module 500 is configured to drive the key body 200 to retract relative to the installation space 110. In some embodiments, the return module 500 can be directly connected between the key body 200 and the installation body. When the drive module 400 does not apply a driving force, it does not hinder the transmission module 300. At this time, under the return action of the return module 500, the key body 200 can move towards the transmission module 300, realizing the retraction of the key body 200.

In some other embodiments, the return module 500, the transmission module 300, the metal contact 600, and the key body 200 are connected in sequence, and the return module 500 drives the key body 200 to retract relative to the installation body through the transmission module 300 and the metal contact 600 in sequence. In some embodiments, the return module 500 can be directly connected between the transmission module 300 and the installation body. When the drive module 400 does not apply a driving force, it does not hinder the transmission module 300. At this time, under the return action of the return module 500, the transmission module 300 can move towards the drive module 400, and the metal contact 600 synchronously drives the key body 200 to move, thereby realizing the retraction of the key body 200.

Continuing to refer to FIG. 5 and FIG. 6, in some other embodiments, the return module 500 includes a return moving part 510 and a return elastic part 520, the return moving part 510 is movable relative to the installation body, and the return elastic part 520 is connected with the return moving part 510. The return moving part 510 is connected with the key body 200, or the return moving part 510, the transmission module 300, the metal contact 600 and the key body 200 are sequentially connected. In some embodiments, the return elastic part 520 may be a spring, one end of which is connected with the return moving part 510, and the other end of which is connected with the installation body.

Further, the return moving part 510 is arranged opposite to the locking part 320. When the locking part 320 is squeezed and moves towards the key body 200, the locking part 320 pushes the return moving part 510 to move, and makes the return elastic part 520 to store elastic force. When the locking part 320 releases the squeezing effect, under the elastic force of the return elastic part 520, the return moving part 510 squeezes the locking part 320 to move away from the key body 200. At this time, the locking part 320, the metal contact 600 and the key body 200 are sequentially connected, so that the key body 200 can retract into the installation body synchronously.

Continuing to refer to FIG. 5 and FIG. 6, in order to realize the pressing operation of the key body 200, the metal contact 600 in the embodiments of the present application includes a pressure detection module, and the pressure detection module is arranged between the key body 200 and the transmission module 300, and the pressure detection module is electrically connected with the circuit board of the electronic device. In some embodiments, the pressure detection module may be a pressure sensor. When the user operates and presses the key body 200, the pressure sensor can detect the operation and pressing behavior, and convert the behavior into an electrical signal and transmit it to the circuit board, thereby realizing the control of the electronic device. For example, when the key body 200 is a game shoulder key, the user can operate and press the game shoulder key, and the pressure sensor can convert the operation and pressing behavior into an electrical signal and transmit it to the circuit board to realize game operation.

In some embodiments, the pressure detection module is fixed between the key body 200 and the return moving part 510 of the return module 500. On the one hand, the return moving part 510 can drive the key body 200 to retract through the pressure detection module. On the other hand, the locking part 320 can also push the key body 200 to extend out through the return moving part 510 and the pressure detection module.

In some embodiments, the shape memory alloy part is a linear part and can retract and deform when powered on, so as to generate tension on the power transmission mechanism 420, so that the power transmission mechanism 420 can deform or move, the shape memory alloy part can return to the original shape when powered on, thereby releasing the pulling effect on the power transmission mechanism 420, so that the key body 200 of the lifting key can retract.

The embodiments of the present application also disclose an electronic device. The disclosed electronic device includes an electronic device body 100 and a lifting key. The electronic device body 100 has an installation space 110, and the lifting key is arranged in the installation space 110.

In some embodiments, the electronic device body 100 includes a frame body as the installation body, and the frame body is provided with an installation hole as the installation space 110, and the key body is arranged in the installation hole, and can extend out of the installation hole or retract into the installation hole.

In some embodiments, one installation hole, two installation holes or more installation holes can be provided on the frame, and the specific number can be determined according to the number of lifting keys to be installed. For example, when setting two groups of lifting keys on the left and right, two installation holes can be set, so that the user can operate the electronic device with both hands to improve the gaming experience.

The specific working process of the lifting key in the embodiments of the present application is:

When the electronic device does not enter the game mode or the user does not need the key body 200 to extend out, the circuit board controls the shape memory alloy part to be powered off so that it is in its original shape. At this time, the shape memory alloy part will not squeeze the power transmission mechanism 420, so that the key body 200 will not be driven to extend out.

When the electronic device enters the game mode or the user needs the key body 200 to extend out, the circuit board controls the shape memory alloy part to be powered on to cause it to deform, such as retract. At this time, the shape memory alloy part drives the power transmission mechanism 420 to move relative to the electronic device body 100, for example, the shape memory alloy part drives the telescopic rod group 421 and the thrust rod group 422 to extend, and squeezes the transmission module 300 through the thrust rod group 422; or the shape memory alloy part drives the first toggle part 423 to rotate, the first toggle part 423 presses the second toggle part 424 to rotate, and the second toggle part 424 presses the transmission module 300. Further, the shape memory alloy part presses the jacking part 310 through the thrust rod group 422 or the second toggle part 424, so that the jacking part 310 moves towards the key body 200, and the jacking part 310 presses the locking part 320 to move, the locking part 320 presses the return moving part 510 to move, the return moving part 510 presses the pressure detection module, and finally the pressure detection module pushes the key body 200 to extend out relative to the installation space 110. Then, the user can operate the key body 200, and detect the user's operation behavior on the key body 200 through the pressure detection module, so as to control the electronic device, for example, play a game.

When the locking part 320 moves towards the key body 200, it also rotates, and makes the locking block 321 at least partly opposite to the locking groove 332. When the locking part 320 moves in the opposite direction, the locking block 321 is positioned at the locking groove 332 and is supported by the locking groove 332, so that the locking part 320 cannot continue to move in the reverse direction, so that the key body 200 will not retract when the user exerts force on the key body 200. It should be noted herein that since the locking block 321 is supported by the locking groove 332, even if the shape memory alloy part is powered off, the key body 200 cannot retract, thereby ensuring the normal operation of the key body 200 by the user.

When the electronic device exits from the game mode or the user needs the key body 200 to retract, the circuit board controls the shape memory alloy part to be powered on again to make it deform again, such as retract. At this time, the shape memory alloy part drives the power transmission mechanism 420 to move relative to the electronic device body 100, and the jacking part 310 is jacked through the thrust rod group 422 or the second toggle part 424 in the power transmission mechanism 420, so that the jacking part 310 moves towards the key body 200 again, the jacking part 310 squeezes the locking part 320 to move, and at the same time, the locking part 320 also rotates, so that the locking block 321 is separated from the locking groove 332 and is opposite to the avoidance groove 333, and then the circuit board controls the shape memory alloy piece to be powered off. At this time, under the action of the return elastic part 520, the return moving part 510 squeezes the locking part 320, so that the locking part 320 moves into the avoidance groove 333, and at the same time, the return moving part 510 drives, through the pressure detection module, the key body 200 to retract into the installation space 110.

The embodiments of the present application are described above with reference to the accompanying drawings, but the present application is not limited to the above specific implementations, and the above specific implementations are only illustrative and not restrictive. Under the enlightenment of the present application, those of ordinary skill in the art can make many forms without departing from the purpose of the present application and the protection scope of the claims, all of which fall within the protection of the present application.

The invention claimed is:

1. A lifting key, comprising:
a key body telescopically arranged on an installation body;
a transmission module movably arranged on the installation body and arranged opposite to the key body;
a drive module comprising a drive part and a power transmission mechanism connected with the drive part, wherein the drive part at least comprises a shape memory alloy part, and the power transmission mechanism is arranged opposite to the transmission module, and
a metal contact arranged between the key body and the transmission module,
wherein when powered on, the shape memory alloy part deforms, and drives the key body to extend relative to the installation body sequentially through the power transmission mechanism, the transmission module, and the metal contact.

2. The lifting key according to claim 1, wherein:
the power transmission mechanism comprises a telescopic rod group and a thrust rod group in transmission connection with the telescopic rod group, the drive part is in transmission connection with the telescopic rod group, and can drive the telescopic rod group to extend or retract, and
the thrust rod group is arranged opposite to the transmission module.

3. The lifting key according to claim 2, wherein
the telescopic rod group comprises a first support rod and a second support rod that are arranged in a cross manner, a first end of the first support rod is hinged to the installation body, a second end of the first support rod is hinged to the thrust rod group, a first end of the second support rod is movable and rotatable relative to the installation body, and a second end of the second support rod is hinged to the thrust rod group; and
one end of the drive part is connected with the first end of the second support rod, a middle part of the drive part is supported at a hinge joint between the first support rod and the installation body, and the other end of the drive part is electrically connected with the circuit board and is fixed.

4. The lifting key according to claim 1, wherein
the power transmission mechanism comprises a first toggle part and a second toggle part respectively rotatably disposed on the installation body, wherein the first toggle part has a first toggling end for driving the second toggle part to rotate, and the second toggle part has a second toggling end for driving the transmission module to move-, and
one end of the drive part is connected with the first toggle part, and the other end of the drive part is electrically connected with the circuit board of the electronic device and is fixed.

5. The lifting key according to claim 1, wherein the transmission module comprises a jacking part, a locking part and a guide part, wherein the guide part is arranged on the installation body, the guide part has an accommodating space, and the accommodating space is provided with a locking groove and an avoidance groove that are adjacent, wherein the locking part is movably and rotatably arranged in the accommodating space, wherein the locking part is provided with the locking block, and the locking part is arranged opposite to the metal contact, where the jacking part is movably arranged on the guide part, and is arranged opposite to the power transmission mechanism; and
when the jacking part jacks the locking part, the locking block can switch between the locking groove and the avoidance groove, and the jacking part can jack the key body sequentially through the locking part and the metal contact.

6. The lifting key according to claim 5, wherein a protrusion is provided in the accommodating space, an end surface of the protrusion is provided with a first tooth-shaped structure and a second tooth-shaped structure, the locking groove is formed between the first tooth-shaped structure and the second tooth-shaped structure, and the avoidance groove is respectively disposed on both sides of the protrusion.

7. The lifting key according to claim 1, further comprising a return module, wherein
the return module is connected with the key body, and the return module is configured to drive the key body to retract relative to the installation body, or
the return module, the transmission module, the metal contact, and the key body are connected in sequence, and the return module drives the key body to retract relative to the installation body through the transmission module and the metal contact in sequence.

8. The lifting key according to claim 7, wherein
the return module comprises a return moving part and a return elastic part, wherein the return moving part is movable relative to the installation body, and the return elastic part is connected with the return moving part; and
the return moving part is connected with the key body, or the return moving part, the transmission module, the metal contact, and the key body are connected in sequence.

9. The lifting key according to claim 1, wherein the metal contact comprises a pressure detection module, wherein the pressure detection module is arranged between the key body and the transmission module, and the pressure detection module is electrically connected with the circuit board of the electronic device.

10. The lifting key according to claim 1, wherein the shape memory alloy part retracts and deforms when powered on, and returns to an original shape when powered off.

11. An electronic device, comprising an electronic device body; and a lifting key, wherein
the electronic device body has an installation space, and the lifting key is arranged in the installation space and comprises:
a key body telescopically arranged on an installation body;
a transmission module movably arranged on the installation body and arranged opposite to the key body;
a drive module comprising a drive part and a power transmission mechanism connected with the drive part, wherein the drive part at least comprises a shape memory alloy part, and the power transmission mechanism is arranged opposite to the transmission module, and
a metal contact arranged between the key body and the transmission module,
wherein when powered on, the shape memory alloy part deforms, and drives the key body to extend relative to the installation body sequentially through the power transmission mechanism, the transmission module, and the metal contact.

12. The electronic device according to claim 11, wherein the electronic device body comprises a frame body as the installation body, the installation space is an installation hole disposed in the frame body, and the key body is disposed in the installation hole, and can extend out of the installation hole or retract into the installation hole.

13. The electronic device according to claim 11, wherein:
the power transmission mechanism comprises a telescopic rod group and a thrust rod group in transmission connection with the telescopic rod group,
the drive part is in transmission connection with the telescopic rod group, and can drive the telescopic rod group to extend or retract, and
the thrust rod group is arranged opposite to the transmission module.

14. The electronic device according to claim 13, wherein:
the telescopic rod group comprises a first support rod and a second support rod that are arranged in a cross manner, a first end of the first support rod is hinged to the installation body, a second end of the first support rod is hinged to the thrust rod group, a first end of the second support rod is movable and rotatable relative to the installation body, and a second end of the second support rod is hinged to the thrust rod group; and
one end of the drive part is connected with the first end of the second support rod, a middle part of the drive part is supported at a hinge joint between the first support rod and the installation body, and the other end of the drive part is electrically connected with the circuit board and is fixed.

15. The electronic device according to claim 11, wherein:
the power transmission mechanism comprises a first toggle part and a second toggle part respectively rotatably disposed on the installation body, wherein the first toggle part has a first toggling end for driving the second toggle part to rotate, and the second toggle part has a second toggling end for driving the transmission module to move; and
one end of the drive part is connected with the first toggle part, and the other end of the drive part is electrically connected with the circuit board of the electronic device and is fixed.

16. The electronic device according to claim 11, wherein the transmission module comprises a jacking part, a locking part and a guide part, wherein the guide part is arranged on the installation body, the guide part has an accommodating space, and the accommodating space is provided with a locking groove and an avoidance groove that are adjacent, wherein the locking part is movably and rotatably arranged in the accommodating space, wherein the locking part is provided with the locking block, and the locking part is arranged opposite to the metal contact, where the jacking part is movably arranged on the guide part, and is arranged opposite to the power transmission mechanism; and
when the jacking part jacks the locking part, the locking block can switch between the locking groove and the avoidance groove, and the jacking part can jack the key body sequentially through the locking part and the metal contact.

17. The electronic device according to claim 16, wherein a protrusion is provided in the accommodating space, an end surface of the protrusion is provided with a first tooth-shaped structure and a second tooth-shaped structure, the locking groove is formed between the first tooth-shaped structure and the second tooth-shaped structure, and the avoidance groove is respectively disposed on both sides of the protrusion.

18. The electronic device according to claim 11, wherein the lifting key further comprises a return module, wherein
the return module is connected with the key body, and the return module is configured to drive the key body to retract relative to the installation body, or
the return module, the transmission module, the metal contact, and the key body are connected in sequence, and the return module drives the key body to retract relative to the installation body through the transmission module and the metal contact in sequence.

19. The electronic device according to claim 18, wherein:
the return module comprises a return moving part and a return elastic part, wherein the return moving part is movable relative to the installation body, and the return elastic part is connected with the return moving part; and
the return moving part is connected with the key body, or the return moving part, the transmission module, the metal contact, and the key body are connected in sequence.

20. The electronic device according to claim 11, wherein the metal contact comprises a pressure detection module, wherein the pressure detection module is arranged between the key body and the transmission module, and the pressure detection module is electrically connected with the circuit board of the electronic device.

* * * * *